(12) United States Patent
Son et al.

(10) Patent No.: US 9,614,455 B2
(45) Date of Patent: *Apr. 4, 2017

(54) HIGH VOLTAGE DIRECT CURRENT TRANSMISSION SYSTEM AND CONTROL METHOD THEREOF

(71) Applicant: LSIS CO., LTD., Anyang-si, Gyeonggi-do (KR)

(72) Inventors: Gum Tae Son, Seoul (KR); Ho Hwan Park, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,076

(22) Filed: Apr. 24, 2015

(65) Prior Publication Data

US 2015/0333647 A1    Nov. 19, 2015

(30) Foreign Application Priority Data

May 13, 2014   (KR) .................. 10-2014-0057388

(51) Int. Cl.
*H02M 5/45* (2006.01)
*H02M 5/44* (2006.01)
(Continued)

(52) U.S. Cl.
CPC ............ *H02M 5/44* (2013.01); *H02J 3/36* (2013.01); *H02M 1/12* (2013.01); *H02M 5/45* (2013.01);
(Continued)

(58) Field of Classification Search
CPC ...... H02M 7/7575; H02M 5/40; H02M 5/458; H02M 5/4575; H02M 1/12; H02M 1/32; H02M 5/4505
(Continued)

(56) References Cited

U.S. PATENT DOCUMENTS

| 6,400,585 B2 * | 6/2002 | Jiang-Hafner ............ H02J 3/36 363/35 |
| 2002/0008982 A1 | 1/2002 | Jiang-Hafner | |

FOREIGN PATENT DOCUMENTS

| JP | 04-193030 | 7/1992 |
| JP | H04193031 | 7/1992 |

(Continued)

OTHER PUBLICATIONS

JP04-193030 (translation document), Machine translation obtained by STIC services on May 9, 2016.*

(Continued)

*Primary Examiner* — Fred E Finch, III
*Assistant Examiner* — Rafael O De Leon Domenech
(74) *Attorney, Agent, or Firm* — Lee, Hong, Degerman, Kang & Waimey PC

(57) ABSTRACT

A high voltage direct current (HVDC) transmission system is provided. The high voltage direct current (HVDC) transmission system includes: a rectifier converting alternating current (AC) power into DC power; an inverter converting the DC power into the AC power; a DC transmission line transmitting, to the inverter, the DC power obtained through conversion by the rectifier; a first active power measurement unit measuring first active power input to the rectifier; a second active power measurement unit measuring second active power output from the inverter; and a first control unit detecting an abnormal voltage state on the DC transmission line based on the first and second active power measured.

8 Claims, 4 Drawing Sheets

(51) Int. Cl.
  *H02M 1/12* (2006.01)
  *H02J 3/36* (2006.01)
  *H02M 7/757* (2006.01)
  *H02M 1/32* (2007.01)
(52) U.S. Cl.
  CPC ............ *H02M 1/32* (2013.01); *H02M 5/4505* (2013.01); *H02M 7/7575* (2013.01); *Y02E 60/60* (2013.01)
(58) Field of Classification Search
  USPC .......................................................... 363/35
  See application file for complete search history.

(56) References Cited

FOREIGN PATENT DOCUMENTS

| | | |
|---|---|---|
| KR | 10-2011-0035732 | 4/2011 |
| KR | 10-2013-0117547 | 10/2013 |
| WO | 2012/044369 | 4/2012 |

OTHER PUBLICATIONS

European Patent Office Application Serial No. 15165573.5, Search Report dated Oct. 19, 2015, 8 pages.
Qahraman, et al., "An electromagnetic transient simulation model for voltage sourced converter based HVDC transmission," Electrical and Computer Engineering, Canadian Conference on Niagara Falls, XP010734007, May 2004, pp. 1063-1066.
Korean Intellectual Property Office Application Serial No. 10-2014-0057388, Office Action dated Mar. 17, 2015, 4 pages.
Japan Patent Office Application No. 2015-097246, Office Action dated Aug. 9, 2016, 2 pages.
Chinese Patent Application No. 201510239415.9, Office Action dated Jan. 5, 2017, 35 pages.

* cited by examiner

HIGH VOLTAGE DIRECT CURRENT TRANSMISSION SYSTEM AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0057388, filed on May 13, 2014, the contents of which are hereby incorporated by reference herein in its entirety.

BACKGROUND

The present disclosure relates to a high voltage direct current (HVDC) transmission system and a control method thereof, and more particularly, to an HVDC transmission system and a control method thereof that may detect an abnormal voltage on a DC transmission line.

High voltage direct current (HVDC) transmission indicates converting alternating current (AC) power produced at a power station into DC power by a transmission site to transmit the DC power, and then re-converting the DC power into the AC power by a reception site to supplying the AC power.

An HVDC transmission system is applied to submarine cable power transmission, large-amount long-distance power transmission, interconnection between AC systems, etc. Also, the HVDC transmission system enables different frequency systems interconnection and asynchronism interconnection.

The transmission site converts the AC power into the DC power. That is, since transmitting the AC power by using a submarine cable is significantly dangerous, the transmission site converts the AC power into the DC power to transmit the DC power to the reception site.

In this case, the transmission site transmits the DC power to the reception site through a transmission line. However, when there is an abnormal DC flowing on the transmission line or there is an abnormal voltage across the transmission line, i.e., when there is an overcurrent or overvoltage on the transmission line, an HVDC transmission system may be damaged.

Thus, there is a need to quickly detect an abnormal state on the transmission line and cope with the state.

SUMMARY

Embodiments provide a high voltage direct current (HVDC) transmission system and a control method thereof that may efficiently detect an abnormal voltage state on a DC transmission line and control the operation of the HVDC transmission system.

In one embodiment, a high voltage direct current (HVDC) transmission system includes: a rectifier converting alternating current (AC) power into DC power; an inverter converting the DC power into the AC power; a DC transmission line transmitting, to the inverter, the DC power obtained through conversion by the rectifier; a first active power measurement unit measuring first active power input to the rectifier; a second active power measurement unit measuring second active power output from the inverter; and a first control unit detecting an abnormal voltage state on the DC transmission line based on the first and second active power measured.

The first control unit may measure the ratio of the second active power to the first active power to detect the abnormal voltage state on the DC transmission line.

The first control unit may confirm that there is an abnormal voltage on the DC transmission line, when the ratio of the second active power to the first active power is out of a reference ratio range.

The first control unit may generate a trip signal stopping the operation of the HVDC transmission system when it is confirmed that there is the abnormal voltage on the DC transmission line.

The first active power measurement unit may measure an AC and an AC voltage input to the rectifier to measure the first active power, and the second active power measurement unit measures the AC and the AC voltage output from the inverter to measure the second active power.

The high voltage direct current (HVDC) transmission system may further include a second control unit receiving the second active power measured by the second active power measurement unit.

The first control unit may receive information on the second active power from the second control unit, and detect the abnormal voltage state on the DC transmission line based on the first active power and the received information on the second active power.

The high voltage direct current (HVDC) transmission system may further include: a first AC filter removing a harmonic current generated in the power conversion process of the rectifier, and a second AC filter removing the harmonic current generated in the power conversion process of the inverter.

Each of the rectifier and the inverter may include any one of a thyristor value and an insulated gate bipolar transistor (IGBT) valve.

The high voltage direct current (HVDC) transmission system may further include: a first capacitor connected to the rectifier in parallel and smoothing a DC output from the rectifier; and a second capacitor connected to the inverter in parallel and smoothing a DC input to the inverter.

The details of one or more embodiments are set forth in the accompanying drawings and the description below. Other features will be apparent from the description and drawings, and from the claims.

DETAILED DESCRIPTION OF THE EMBODIMENTS

Figure 1:
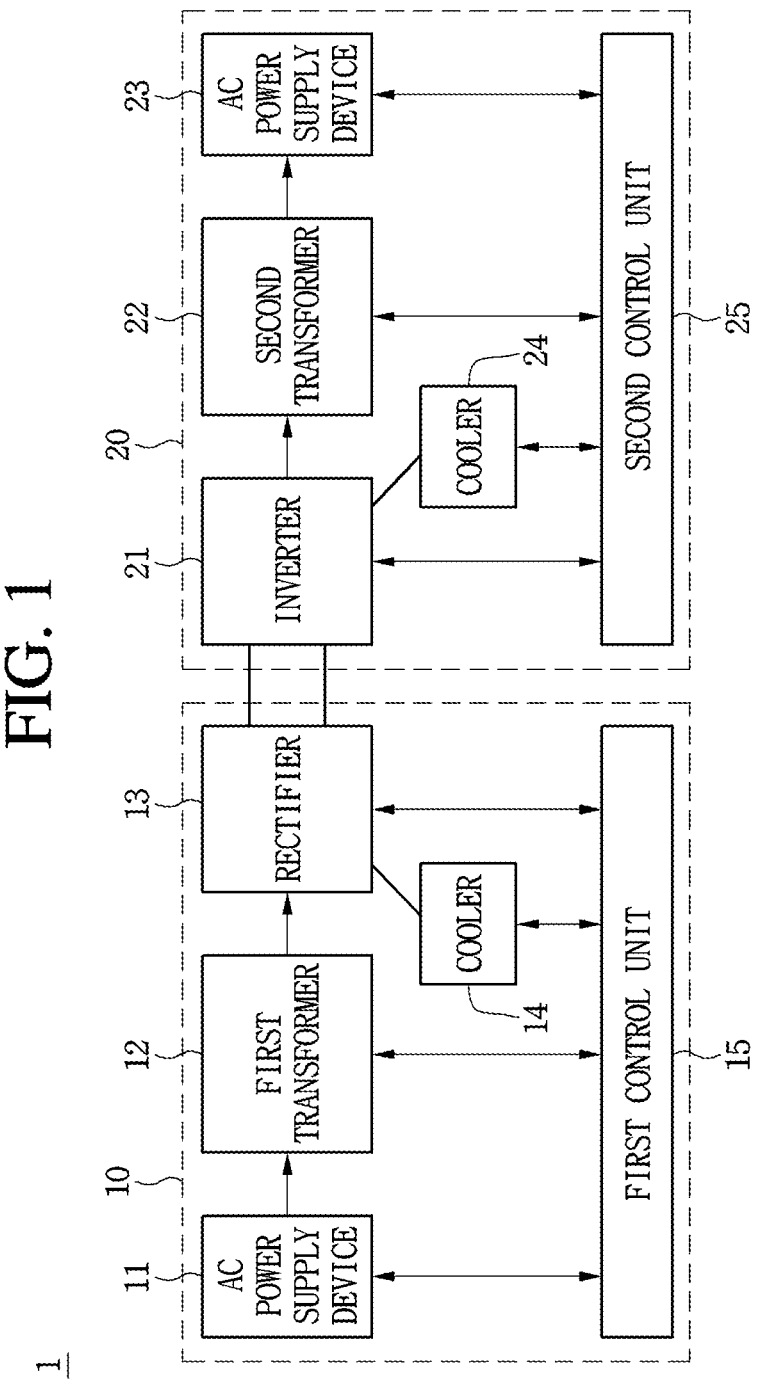
FIG. 1 is a diagram for explaining the configuration of a high voltage direct current (HVDC) transmission system according to an embodiment.

Some embodiments are described below in more detail with reference to the accompanying drawings. Since the suffixes "module" and "unit" for components used in the following description are given and interchanged for easiness in making the present disclosure, they do not have distinct meanings or functions.

The effects and features of the inventive concept, and implementation methods thereof will be clarified through following embodiments below described in detail with reference to the accompanying drawings. An embodiment may, however, be embodied in different forms and should not be construed as limited to the embodiments set forth herein. Rather, these embodiments are provided to make this disclosure thorough and complete and fully convey the scope of an embodiment to a person skilled in the art. Further, the present invention is only defined by scopes of claims. Like reference numerals throughout the disclosure refer to like components.

When describing embodiments, detailed descriptions related to known functions or configurations will be ruled out in order not to unnecessarily obscure subject matters of the embodiments. In addition, since the terms used herein are defined in consideration of functions in the embodiments, they may vary depending on a user's or operator's intention or practice. Therefore, their definitions needs to be made based on details throughout the present disclosure.

Combinations of each block of the accompanying drawings and combinations of each step of a flowchart may also be performed by computer program instructions. Since the computer program instructions may be loaded on the processor of a general-purpose computer, a special-purpose computer or other programmable data processing equipment, the instructions performed by the processor of the computer or other programmable data processing equipment create means that performs functions described on each block of a drawing or each step of a flowchart. Since the computer program instructions may also be stored in a computer usable or computer readable memory that may aim at the computer or other programmable data processing equipment in order to implement functions in a specific manner, the instructions stored in the computer usable or computer readable memory may also produce an item that includes an instruction means performing functions described on each block of a drawing or each step of a flowchart. The computer program instructions may also be loaded on the computer or other programmable data processing equipment. Thus, since a series of operation steps are performed on the computer or other programmable data processing equipment to create processes executed by a computer, instructions operating the computer or other programmable data processing equipment may also provide steps for performing functions described on each block of a drawing and each step of a flowchart.

Also, each block or each step may represent a portion of a module, a segment or a code that includes one or more executable instructions for performing specific logical function(s). Also, it should be noted that some alternative embodiments may be performed in such a way that functions mentioned at blocks or steps are performed in a different order. For example, two blocks or steps shown one after another may also be performed substantially at the same time or the blocks or steps may also be sometimes performed in a reverse order according to a corresponding function.

FIG. 1 is a diagram for explaining the configuration of a high voltage direct current (HVDC) transmission system according to an embodiment.

An HVDC transmission system 1 according to an embodiment may be any one of a thyristor HVDC transmission system and a voltage HVDC system. The thyristor HVDC system may be a current HVDC transmission system using a thyristor valve as a rectifier, and the voltage HVDC transmission system may be a system using an insulated gate bipolar transistor (IGBT) device.

In the case of the thyristor HVDC system, a rotating device, such as a generator or synchronous compensator in order to rectify a rhyristor valve is needed for an inverter-side system, and a capacitor band for compensating for reactive power may be included in the rectifier or the inverter-side system.

Since the voltage HVDC system significantly decreases harmonics through fast switching, it is possible to decrease the size of a harmonic filter for removing the harmonics and there is no need to supply reactive power. Also, the voltage HVDC transmission system may independently control active power and reactive power.

Referring to FIG. 1, the HVDC transmission system 1 according to an embodiment includes a first power converter 10 and a second power converter 20.

The first power converter 10 includes an alternating current (AC) power supply device 11, a first transformer 12, a rectifier 13, a cooler 14, and a first control unit 15.

The AC power supply device 11 may produce AC power and transmit the AC power to the first transformer 12. In an embodiment, the AC power supply device 11 may be a power station that may produce and supply power, such as a wind power station.

The first transformer 12 may increase the size of the AC voltage of the AC power received from the AC power supply device 11 and convert AC power having a high voltage.

The rectifier 13 may convert HVAC power obtained through conversion by the first transformer 12 into DC power.

The cooler 14 may cool heat emitting from the rectifier 13. In particular, the cooler 14 may cool heat emitting from the rectifier 13 and related parts, by circulating coolant.

The first control unit 15 may control the overall operations of the first power converter 10. In particular, the first control unit 15 may control the size of AC power, the phase of AC power, active power and reactive power of any one terminal of the first power converter 10.

The DC power obtained through conversion by the rectifier 13 may be transmitted to the second power converter 20 through a DC line.

The second power converter 20 includes an inverter 21, a second transformer 22, an AC power supply device 23, a cooler 24, and a second control unit 25.

The inverter 21 converts the DC power transmitted from the first power converter 10 through the DC line, into AC power.

The second transformer 22 converts the AC power obtained through conversion by the inverter 21, into low voltage AC power.

The AC power supply device 23 receives the low voltage AC power from the second transformer 23.

The cooler 24 may cool heat emitting from the inverter 21.

The second control unit 25 controls the overall components of the second converter 20. The second control unit 25 may control the size of AC power, the phase of AC power, active power and reactive power of any one terminal of the second power converter 20.

Figure 2:
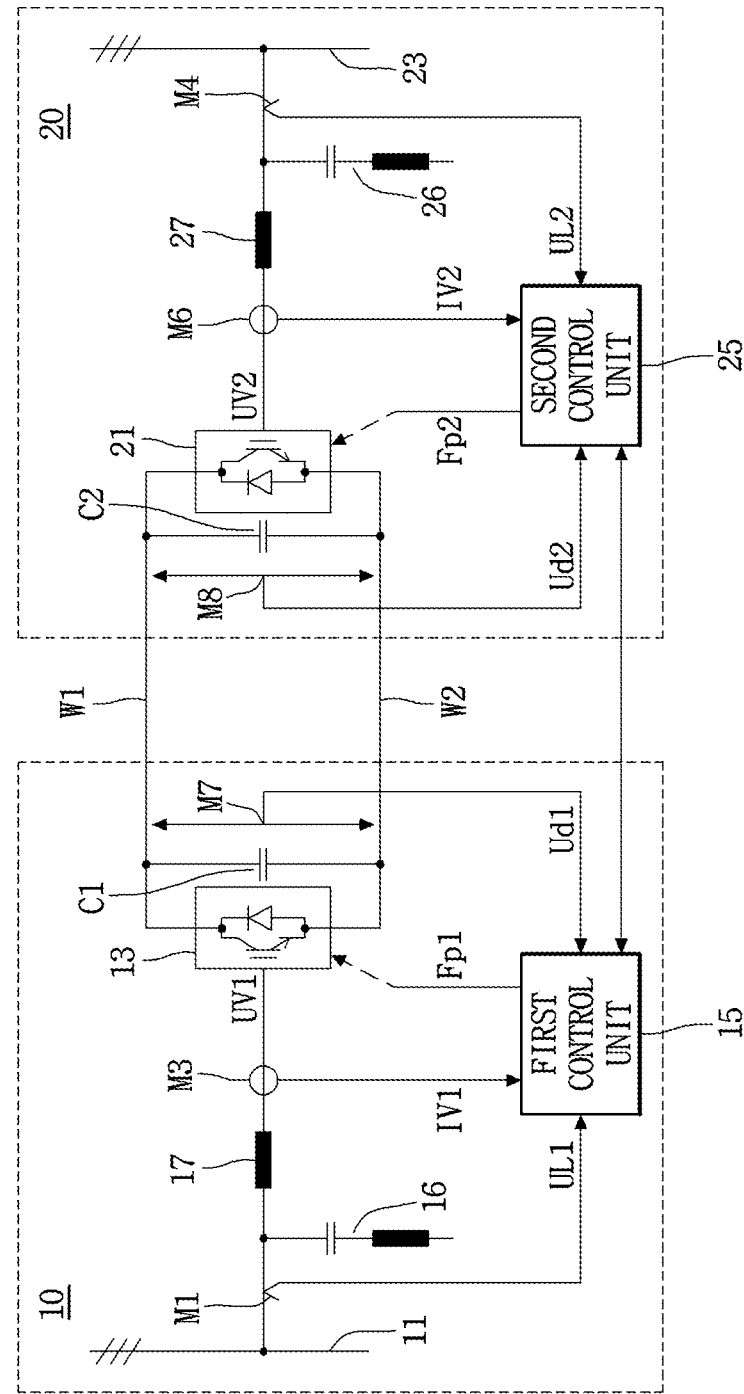
FIG. 2 is a diagram for explaining the actual configuration of an HVDC transmission system according to an embodiment.

FIG. 2 is a diagram for explaining the actual configuration of an HVDC transmission system according to an embodiment.

Referring to FIG. 2, the HVDC transmission system 1 according to an embodiment includes the first power converter 10 and the second power converter 20.

The first power converter 10 may convert AC power into DC power to provide the DC power to the second power converter 20, and the second power converter 20 may convert the DC power received from the first power converter 10 into AC power.

The first power converter 10 and the second power converter 20 may be connected by positive-pole DC transmission lines W1 and W2. The DC transmission lines W1 and W2 may transmit a DC or a DC voltage output by the first power converter to the second power converter 20.

The DC transmission lines W1 and W2 may be any one of an overhead line and a cable, or a combination thereof.

The first power converter 10 includes an AC power supply device 11, a first AC filter 16, a first inductor 17, a rectifier 13, a first capacitor C1, a first measurement unit M1, a second measurement unit M3, a third measurement unit M7, and a first control unit.

The AC power supply device 11 may produce AC power and transmit the AC power to the rectifier 13. The AC power supply device 11 may be a power station that may produce and supply power, such as a wind power station.

The AC power supply device 11 may transmit three-phase AC power to the rectifier 13.

The first AC filter 16 may be disposed between the AC power supply device 11 and the rectifier 13. The first AC filter 16 may remove current harmonics generated in the process of converting AC power into DC power by the rectifier 13. That is, the first AC filter 16 may remove the current harmonics to block the current harmonics from entering the AC power supply device 11. In an embodiment, the first AC filter 16 may include a resonant circuit including a capacitor, an inductor, and a resistor.

Also, the first AC filter 16 may also supply reactive power consumed in the rectifier 13.

The first inductor 17 may also be disposed between the first AC filter 13 and the rectifier 13.

The first inductor 17 may transmit, to the rectifier 13, an AC from which the current harmonics have been removed through the first AC filter 16. The first inductor 17 may be an inductor that adjusts the phase of the AC from which the current harmonics have been removed through the first AC filter 16.

The rectifier 13 may convert the AC power received from the AC power supply device 11, in particular, the first inductor 17, into DC power.

The rectifier 13 may be a semiconductor valve that may convert AC power into DC power. In an embodiment, the semiconductor valve may be any one of a thyristor valve and an IGBT valve.

The first capacitor C1 may be a smoothing capacitor that is connected to the rectifier 13 in parallel and smoothes a DC voltage output from the rectifier 13.

The first measurement unit M1 may measure an AC voltage UL1 supplied by the AC power supply device 11 and transmit a measured voltage to the first control unit 15. The first measurement unit M1 may measure an AC voltage UL1 of a point between the AC power supply device 11 and the first AC filter 16 and transmit a measured voltage to the first control unit 15. In the following, the AC voltage UL1 measured on the point between the AC power supply device 11 and the first AC filter 16 is referred to as a bus voltage UL1.

The second measurement unit M3 may measure an AC IV1 or AC voltage UV1 input to the output of the first inductor 17 or to the rectifier 13 and transmit a measured current or voltage to the first control unit 15. In the following, the AC voltage UV1 input to the output of the first inductor 17 or to the rectifier 13 is referred as a bridge voltage UV1.

The third measurement unit M7 may measure a DC voltage Ud1 across the first capacitor C1 and transmit a measured voltage to the first control unit 15.

The first control unit 15 may control the overall operations of the first power converter 10.

The first control unit 15 may control the operations of the rectifier 13 based on the bus voltage UL1 received from the first measurement unit M1, the AC IV1 received from the second measurement unit M3 and input to the rectifier 13, and the DC voltage Ud1 received from the third measurement unit M7 and across the first capacitor C1.

When the rectifier 13 is of an IGBT valve type, the first control unit 15 may transmit a turn-on signal or turn-off signal to the rectifier 13 based on the bus voltage UL1 received from the first measurement unit M1, the AC IV1 received from the second measurement unit M3 and input to the rectifier 13, and the DC voltage Ud1 received from the third measurement unit M7 and across the first capacitor C1 to control the operations of the rectifier 13. The conversion from AC power into DC power may be controlled by the turn-on signal or turn-off signal.

Also, the first control unit 15 may generate a phase change command signal based on an abnormal voltage state on the DC transmission lines W1 and W2, and adjust the phase difference between the bridge voltage UV1 and the bus voltage UL1 according to a generated phase change command signal.

In particular, when a DC voltage (e.g., the DC voltage Ud1 across the first capacitor C1) measured at a point on the DC transmission line W1 exceeds a reference value for a certain time, the first control unit 15 may confirm that there is an abnormal voltage on the DC transmission line. When it is confirmed that there is the abnormal voltage on the DC transmission line, the first control unit 15 may generate a phase change command signal and adjust the phase difference between the bridge voltage UV1 and the bus voltage UL1.

The first control unit 15 may adjust the phase difference between the bridge voltage UV1 and the bus voltage UL1 to adjust a DC voltage obtained through conversion by the rectifier 13, so it is possible to prevent a DC voltage on the DC transmission line from sharply increasing.

The second power converter 20 includes an inverter 21, a second capacitor C2, a second inductor 27, a second AC filter 26, an AC power supply device 23, a fourth measurement unit M8, a fifth measurement unit M6, a fourth measurement unit M4, and a second control unit 25.

The inverter 21 may be a semiconductor valve that may convert DC power received from the rectifier 13 into AC power. In an embodiment, the semiconductor valve may be any one of a thyristor valve and an IGBT valve.

The inverter 21 may receive a DC or a DC voltage from the inverter 21 through the DC transmission lines W1 and W2, and converter the received DC or DC voltage into an AC or an AC voltage.

The second capacitor C2 may be connected to the rectifier 13 in parallel, and may be a smoothing capacitor that smoothes the DC voltage input to the inverter 21.

The second inductor 27 may be disposed between the inverter 21 and the second AC filter 26. The second inductor 27 may transmit AC power output from the inverter 21, to the AC power supply device 23. The second inductor 27 may be a phase inductor that adjusts the phase of an AC.

The second AC filter 26 may be disposed between the second inductor 27 and the AC power supply device 23. The second AC filter 26 may remove current harmonics generated in the process of converting AC power into DC power by the inverter 21. That is, the second AC filter 26 may remove the current harmonics to block the current harmonics from entering the AC power supply device 23. In an embodiment, the second AC filter 26 may include a resonant circuit including a capacitor, an inductor, and a resistor.

Also, the second AC filter 26 may also supply reactive power consumed in the inverter 21.

The AC power supply device 23 may receive, through the second AC filter 26, AC power from which the harmonics have been removed.

The fourth measurement unit M8 may measure a DC voltage Ud2 across the second capacitor C2 and transmit a measured voltage to the second control unit 25.

The fifth measurement unit M6 may measure an AC IV2 or AC voltage UV2 output from the input of the second inductor 27 or from the inverter 21 and transmit a measured current or voltage to the second control unit 25. In the following, the AC voltage UV2 output from the output of the second inductor 27 or from the inverter 21 is referred as a bridge voltage UV2.

The sixth measurement unit M4 may measure an AC voltage UL2 supplied by the AC power supply device 23 and transmit a measured voltage to the second control unit 25. The sixth measurement unit M4 may measure an AC voltage UL2 of a point between the AC power supply device 23 and the second AC filter 26 and transmit a measured voltage to the second control unit 25. In the following, the AC voltage UL2 measured on the point between the AC power supply device 23 and the second AC filter 26 is referred to as a bus voltage UL2.

The second control unit 25 may control the overall operations of the second power converter 20.

The second control unit 15 may control the operations of the inverter 21 based on the bus voltage UL2 received from the sixth measurement unit M4, the AC IV2 received from the fifth measurement unit M6 and output from the inverter 21, and the DC voltage Ud2 received from the sixth measurement unit M4 and across the second capacitor C2.

If the inverter 21 is of an IGBT valve type, the second control unit 25 may transmit a turn-on signal or turn-off signal to the inverter 21 based on the bus voltage UL2 received from the sixth measurement unit M4, the AC IV2 received from the fifth measurement unit M6 and output from the inverter 21, and the DC voltage Ud2 received from the fourth measurement unit M8 and across the second capacitor C2 to control the operations of the inverter 21. The conversion from DC power into AC power may be controlled by the turn-on signal or turn-off signal.

Also, the second control unit 25 may generate a phase change command signal based on an abnormal voltage state on the DC transmission lines W1 and W2, and adjust the phase difference between the bridge voltage UV2 and the bus voltage UL2 according to a generated phase change command signal.

In particular, when a DC voltage (e.g., the DC voltage Ud2 across the second capacitor C2) measured at a point on the DC transmission line W1 exceeds a reference value for a certain time, the second control unit 15 may confirm that there is an abnormal voltage on the DC transmission line. When it is confirmed that there is the abnormal voltage on the DC transmission line, the second control unit 25 may generate a phase change command signal and adjust the phase difference between the bridge voltage UV2 and the bus voltage UL2.

The HVDC transmission system 1 according to an embodiment of FIG. 2 detects the abnormal voltage state on the DC transmission line to adjust the phase difference between the bridge voltage UV1 and the bus voltage UL1. Thus, since it is possible to prevent an excessive DC voltage from being applied to the DC transmission line, the HVDC transmission system 1 may operate within a secure operation limit.

However, the HVDC transmission system 1 according to the embodiment of FIG. 2 needs a means for creating a phase change command signal in order to adjust the phase difference between the bridge voltage UV1 and the bus voltage UL1 and a means for adjusting the phase difference between the bridge voltage UV1 and the bus voltage UL1 according to the phase change command signal and involve complex control processes.

Figure 3:
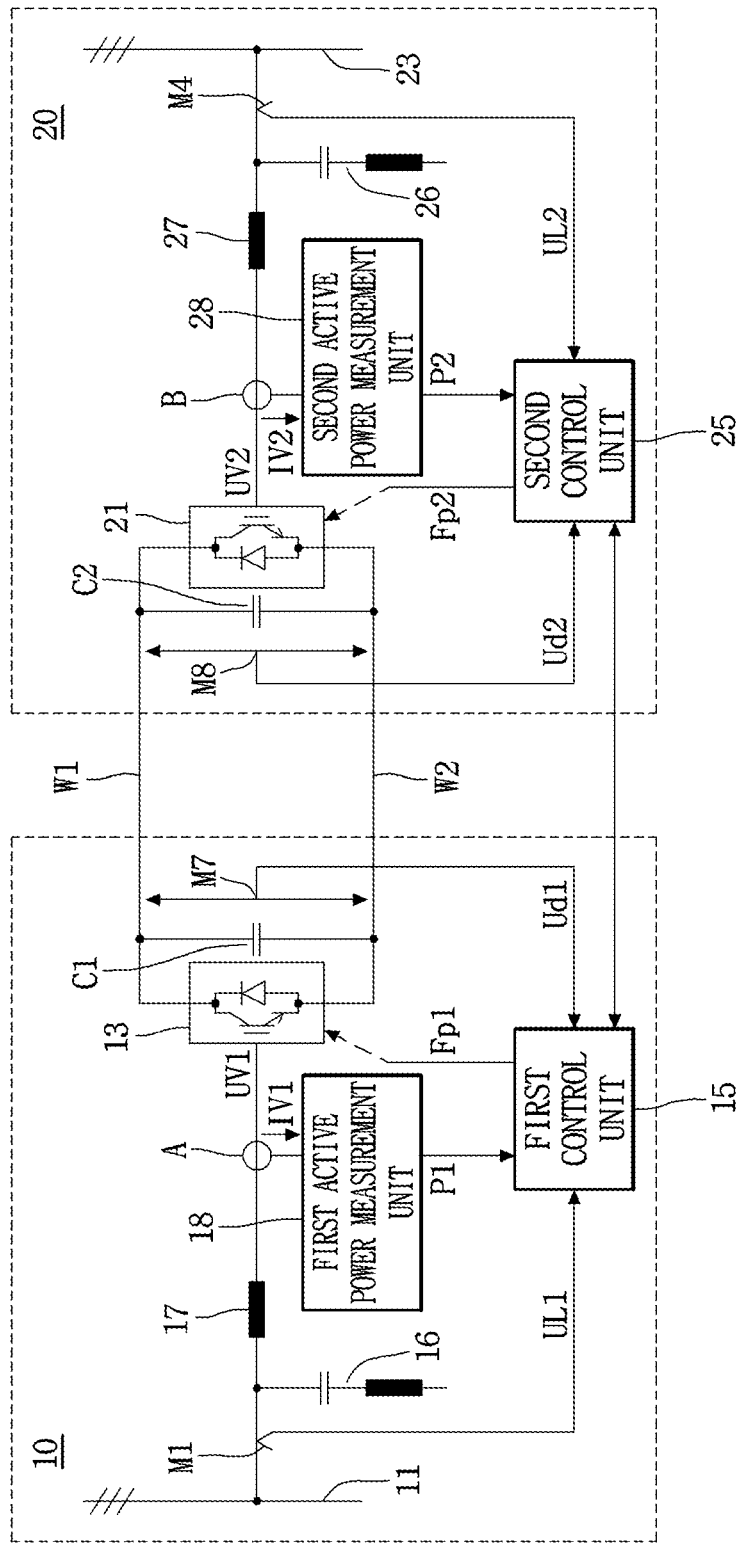
FIG. 3 is a diagram for explaining the configuration of an HVDC transmission system according to another embodiment.

FIG. 3 is a diagram for explaining the configuration of an HVDC transmission system according to another embodiment.

Referring to FIG. 3, an HVDC transmission system 2 according to another embodiment includes a first power converter 10 and a second power converter 20.

The first power converter 10 may convert AC power into DC power to provide the DC power to the second power converter 20, and the second power converter 20 may convert the DC power received from the first power converter 10 into AC power.

The first power converter 10 and the second power converter 20 may be connected by positive-pole DC transmission lines W1 and W2. The DC transmission lines W1 and W2 may transmit a DC or a DC voltage output by the first power converter 10 to the second power converter 20.

The DC transmission lines W1 and W2 may be any one of an overhead line and a cable, or a combination thereof.

The first power converter 10 includes an AC power supply device 11, a first AC filter 16, a first inductor 17, a rectifier 13, a first capacitor C1, a first measurement unit M1, a first active power measurement unit 18, a third measurement unit M7, and a first control unit 15.

The AC power supply device 11 may produce AC power and transmit the AC power to the rectifier 13. The AC power supply device 11 may be a power station that may produce and supply power, such as a wind power station.

The AC power supply device 11 may transmit three-phase AC power to the rectifier 13.

The first AC filter 16 may be disposed between the AC power supply device 11 and the rectifier 13. The first AC filter 16 may remove current harmonics generated in the process of converting AC power into DC power by the rectifier 13. That is, the first AC filter 16 may remove the current harmonics to block the current harmonics from entering the AC power supply device 11. In an embodiment, the first AC filter 16 may include a resonant circuit including a capacitor, an inductor, and a resistor.

Also, the first AC filter 16 may also supply reactive power consumed in the rectifier 13.

The first inductor 17 may be disposed between the first AC filter 13 and the rectifier 13.

The first inductor 17 may transmit, to the rectifier 13, an AC from which the current harmonics have been removed through the first AC filter 16. The first inductor 17 may be an inductor that adjusts the phase of the AC from which the current harmonics have been removed through the first AC filter 16.

The rectifier 13 may convert the AC power received from the AC power supply device 11, in particular, from the first inductor 17, into DC power.

The rectifier 13 may be a semiconductor valve that may convert AC power into DC power. In an embodiment, the semiconductor valve may be any one of a thyristor valve and an IGBT valve.

The first capacitor C1 may be a smoothing capacitor that is connected to the rectifier 13 in parallel and smoothes a DC voltage output from the rectifier 13.

The first measurement unit M1 may measure an AC voltage UL1 supplied by the AC power supply device 11 and transmit a measured voltage to the first control unit 15. The first measurement unit M1 may measure an AC voltage UL1 of a point between the AC power supply device 11 and the first AC filter 16 and transmit a measured voltage to the first control unit 15. In the following, the AC voltage UL1 measured on the point between the AC power supply device 11 and the first AC filter 16 is referred to as a bus voltage UL1.

The first active power measurement unit 18 may measure the active power of e.g., a first point A in FIG. 3 or may measure any point between the output of the first inductor 17 and the input of the rectifier 13.

In particular, the first active power measurement unit 18 may measure the AC IV1 and the AC voltage UV1 input to the output of the first inductor 17 or to the rectifier 13, measure first active power P1 by using the measured AC IV1 and UV1, and then transmit the first active power P1 measured to the first control unit 15. In the following, the AC voltage UV1 input to the output of the first inductor 17 or to the rectifier 13 is referred as a bridge voltage UV1.

The third measurement unit M7 may measure a DC voltage Ud1 across the first capacitor C1 and transmit a measured voltage to the first control unit 15.

The first control unit 15 may control the overall operations of the first power converter 10.

The first control unit 15 may measure the ratio of second active power P2 to the first active power P1 based on the first active power P1 measured and the second active power P2. In an embodiment, the first control unit 15 may receive information on the second active power P2 from the second control unit 25. Each of the first control unit 15 and the second control unit 25 may include a remote communication interface for information exchange between the first power converter 10 and the second power converter 20, and receive information on the first active power P1 and the second active power P2 through the remote communication interface.

The first control unit 15 may use the information on the second active power P2 received from the second control unit 25 to measure the ratio of the second active power P2 to the first active power P1 (a=P2/P1×100). In an embodiment, the first control unit 15 may receive information on the second active power P2 from the second control unit 25. Each of the first control unit 15 and the second control unit 25 may include a remote communication interface for information exchange between the first power converter 10 and the second power converter 20, transmit and receive information on the first active power P1 and the second active power P2 through the remote communication interface.

The first control unit 15 may use the information on the second active power P2 received from the second control unit 25 to measure the ratio of the second active power P2 to the first active power P1 (a=P2/P1×100).

The first control unit 15 may check whether the measured ratio is within a reference ratio range. In an embodiment, the reference ratio range may be a ratio range that may be confirmed that there is no abnormal voltage state on the DC transmission line, and have a range of about 95% to about 98%. However, these figures are only provided for example.

For example, when the first active power P1 is about 100 MW and the second active power P2 is about 96 MW, the ratio of the second active power P2 to the first active power P1 is about 96% and thus it may be confirmed that the ratio is in the reference ratio range, in which case the first control unit 15 may confirm that there is no abnormal voltage state on the DC transmission line.

If the first active power P1 is about 100 MW and the second active power P2 is about 90 MW, the ratio of the second active power P2 to the first active power P1 is about 90% and thus it may be confirmed that the ratio is not in the reference ratio range, in which case the first control unit 15 may confirm that there is an abnormal voltage state on the DC transmission line.

The first control unit 15 may generates a trip signal when the measured ratio is not within the reference ratio range.

That is, when the ratio of the second active power to the first active power is not within the reference ratio range, the first control unit 15 may determine that there is the abnormal voltage state on the DC transmission line and generate the trip signal for stopping the operation of the HVDC transmission system 2.

If the ratio of the second active power to the first active power is within the reference ratio range, the first control unit 15 may determine that there is no abnormal voltage state on the DC transmission line and not generate the trip signal for stopping the operation of the HVDC transmission system 2.

The second power converter 20 includes an inverter 21, a second capacitor C2, a second inductor 27, a second AC filter 26, an AC power supply device 23, a fourth measurement unit M8, a second active power measurement unit 28, a sixth measurement unit M4, and a second control unit 25.

The inverter 21 may be a semiconductor valve that may convert DC power received from the rectifier 13 into AC power. In an embodiment, the semiconductor valve may be any one of a thyristor valve and an IGBT valve.

The inverter 21 may receive a DC or a DC voltage from the inverter 21 through the DC transmission lines W1 and W2, and converter the received DC or DC voltage into an AC or an AC voltage.

The second capacitor C2 may be connected to the inverter 13 in parallel, and may be a smoothing capacitor that smoothes the DC voltage input to the inverter 21.

The second inductor 27 may be disposed between the inverter 21 and the second AC filter 26. The second inductor 27 may transmit AC power output from the inverter 21, to the AC power supply device 23. The second inductor 27 may be a phase inductor that adjusts the phase of an AC.

The second AC filter 26 may be disposed between the second inductor 27 and the AC power supply device 23. The second AC filter 26 may remove current harmonics generated in the process of converting AC power into DC power by the inverter 21. That is, the second AC filter 26 may remove the current harmonics to block the current harmonics from entering the AC power supply device 23. In an embodiment, the second AC filter 26 may include a resonant circuit including a capacitor, an inductor, and a resistor.

Also, the second AC filter 26 may also supply reactive power consumed in the inverter 21.

The AC power supply device 23 may receive, through the second AC filter 26, AC power from which the harmonics have been removed.

The fourth measurement unit M8 may measure a DC voltage Ud2 across the second capacitor C2 and transmit a measured voltage to the second control unit 25.

The second active power measurement unit 28 may measure the active power of e.g., a second point B in FIG. 3 or may measure any point between the output of the first inductor 17 and the input of the rectifier 2.

The second active power measurement unit 28 may measure the AC IV2 and the AC voltage UV2 output from the input of the second inductor 27 or from the inverter 21, measure second active power P2 by using the measured AC IV2 and UV2, and then transmit the second active power P2 measured to the second control unit 25. In the following, the AC voltage UV2 output from the output of the second inductor 27 or from the inverter 21 is referred as a bridge voltage UV2.

The sixth measurement unit M4 may measure an AC voltage UL2 supplied by the AC power supply device 23 and transmit a measured voltage to the second control unit 25. The sixth measurement unit M4 may measure the AC voltage UL2 of a point between the AC power supply device 23 and the second AC filter 26 and transmit a measured voltage to the second control unit 25. In the following, the AC voltage UL2 measured on the point between the AC power supply device 23 and the second AC filter 26 is referred to as a bus voltage UL2.

The second control unit 25 may control the overall operations of the second power converter 20.

The second control unit 25 may measure the ratio of second active power P2 to the first active power P1 based on the first active power P1 measured and the second active power P2. In an embodiment, the second control unit 25 may receive information on the first active power P1 from the first control unit 15. Each of the first control unit 15 and the second control unit 25 may include a remote communication interface for information exchange between the first power converter 10 and the second power converter 20, transmit and receive information on the first active power P1 and the second active power P2 through the remote communication interface.

The second control unit 25 may use the information on the first active power P1 received from the first control unit 15 to measure the ratio of the second active power P2 to the first active power P1 (a=P2/P1×100).

The second control unit 25 may check whether the measured ratio is within a reference ratio range. In an embodiment, the reference ratio range may be a ratio range that may be confirmed that there is no abnormal voltage state on the DC transmission line, and have a range of about 95% to about 98%. However, these figures are only provided for example.

The second control unit 25 generates a trip signal when the measured ratio is not within the reference ratio range.

That is, when the ratio of the second active power to the first active power is not within the reference ratio range, the second control unit 25 may determine that there is the abnormal voltage state on the DC transmission line and generate the trip signal for stopping the operation of the HVDC transmission system 2.

If the ratio of the second active power to the first active power is within the reference ratio range, the second control unit 25 may determine that there is no abnormal voltage state on the DC transmission line and not generate the trip signal for stopping the operation of the HVDC transmission system 2.

Figure 4:
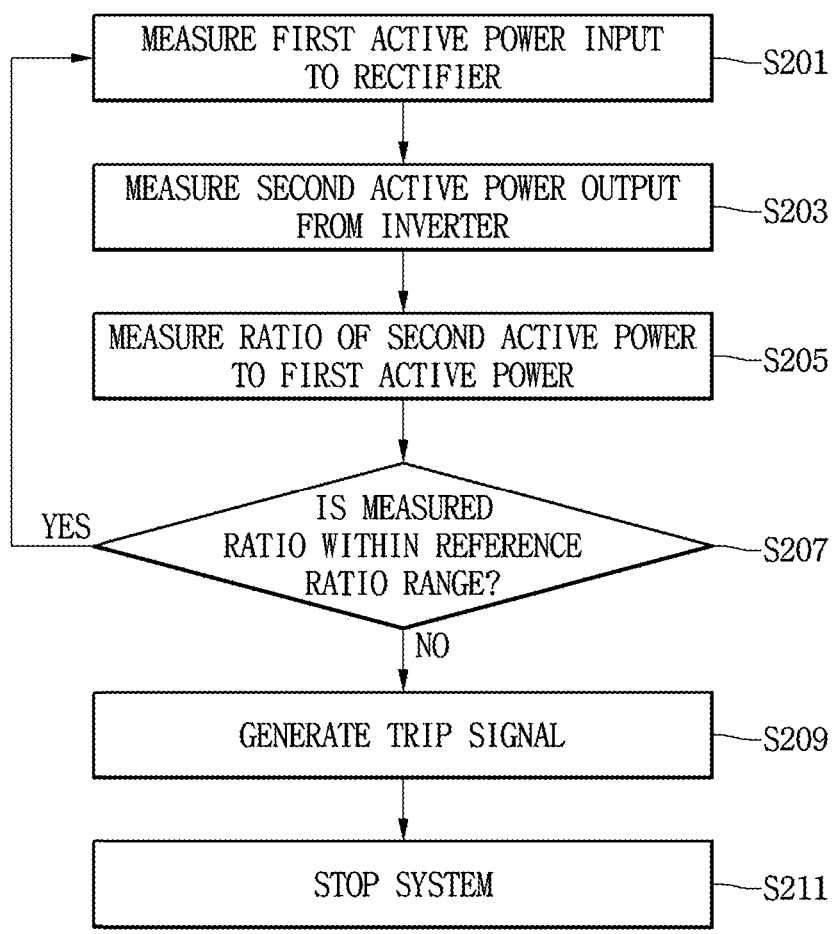
FIG. 4 is a diagram for explaining a control method of an HVDC transmission system according to an embodiment.

FIG. 4 is a diagram for explaining a control method of an HVDC transmission system according to an embodiment.

In the following, the control method of the HVDC transmission system according to an embodiment is described in conjunctions with FIGS. 1 to 3.

Firstly, the first active power measurement unit 18 of the first power converter 10 measures first active power on AC power input to the rectifier 13 in step S201.

In an embodiment, the first active power measurement unit 18 may measure the active power of e.g., the first point A in FIG. 3 or may measure any point between the output of the first inductor 17 and the input of the rectifier 13.

The first active power measurement unit 18 may measure the first active power at the first point A based on the AC IV1 and AC voltage UV1 measured at the first point A.

The first active power measurement unit 18 may use the AC IV1 and AC voltage UV1 input to the rectifier 13 to measure the first active power P1 input to the rectifier 13.

The second active power measurement unit 28 of the second power converter 20 measures second active power on AC power output from the inverter 13 in step S203.

In an embodiment, the second active power measurement unit 28 may measure the active power of e.g., the second point A in FIG. 3 or may measure any point between the input of the second inductor 27 and the output of the inverter 21.

The second active power measurement unit 28 may measure the second active power at the second point B based on the AC IV2 and AC voltage UV2 measured at the second point B.

The second active power measurement unit 28 may use the AC IV2 and AC voltage UV2 output from the inverter 21 to measure the second active power P2 output from the inverter 21.

The first control unit 15 of the first power converter 10 measures the ratio of the second active power P2 to the first active power P1 based on the first active power P1 and second active power P2 measured.

In an embodiment, the first control unit 15 may receive information on the second active power P2 from the second control unit 25. Each of the first control unit 15 and the second control unit 25 may include a remote communication interface for information exchange between the first power converter 10 and the second power converter 20, transmit and receive information on the first active power P1 and the second active power P2 through the remote communication interface.

In an embodiment, cable communication may be used for the transmission/reception of information and control signals between the first control unit 15 and the second control unit 25.

The first control unit 15 may use information on the second active power P2 received from the second control unit 25 to measure the ratio of the second active power P2 to the first active power P1 (a=P2/P1×100).

The first control unit 15 of the first power converter 10 checks whether the measured ratio is within the reference ratio range. In an embodiment, the reference ratio range may be a ratio range that may be confirmed that there is no abnormal voltage state on the DC transmission line, and have a range of about 95% to about 98%. However, these figures are only provided for example.

For example, when the first active power P1 is about 100 MW and the second active power P2 is about 96 MW, the ratio of the second active power P2 to the first active power P1 is about 96% and thus it may be confirmed that the ratio is in the reference ratio range, in which case the first control unit 15 may confirm that there is no abnormal voltage state on the DC transmission line.

If the first active power P1 is about 100 MW and the second active power P2 is about 90 MW, the ratio of the second active power P2 to the first active power P1 is about 90% and thus it may be confirmed that the ratio is not in the reference ratio range, in which case the first control unit 15 may confirm that there is an abnormal voltage state on the DC transmission line.

If the measured ratio is within the reference ratio range, the process goes back to step S201 and when the measured ratio is not within the reference ratio range, the first control unit 15 of the first power converter 10 generates a trip signal in step S209.

That is, when the ratio of the second active power to the first active power is not within the reference ratio range, the first control unit 15 may determine that there is the abnormal voltage state on the DC transmission line and generate the trip signal for stopping the operation of the HVDC transmission system 2.

If the ratio of the second active power to the first active power is within the reference ratio range, the first control unit 15 may determine that there is no abnormal voltage state on the DC transmission line and not generate the trip signal for stopping the operation of the HVDC transmission system 2.

The first control unit 15 of the first power converter 10 stops the operation of the HVDC transmission system 2 according to the generated trip signal It is described in the embodiment of FIG. 4 that the first control unit 15 performs steps S205 to S211, but they may also be performed by the second control unit 25.

According to the control method of the HVDC transmission system 2 according to various embodiments, it is possible to detect the abnormal voltage state on the DC transmission line without a means for generating a phase change command signal for adjusting the phase difference between the bridge voltage UV1 and the bus voltage UL1 and a means for adjusting the phase difference between the bridge voltage UV1 and the bus voltage UL1 according to the phase change command signal to thus prevent a system from unstably operating and it is also possible to decrease the cost of the HVDC transmission system.

Also, according to the control method of the HVDC transmission system 2 according to another embodiment, it is possible to easily check the abnormal voltage state on the DC transmission line by using only active power measured at a point of the first power converter 10 and active power measured at a point of the second power converter 20.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A high voltage direct current (HVDC) transmission system comprising:
    a rectifier configured to convert alternating current (AC) power into direct current (DC) power;
    an inverter configured to convert the DC power into the AC power;
    a DC transmission line configured to transmit, to the inverter, the DC power obtained through conversion by the rectifier;
    a first active power measurement unit configured to measure first active power input to the rectifier;
    a second active power measurement unit configured to measure second active power output from the inverter; and
    a first control unit configured to:
    determine a ratio of the second active power to the first active power; and
    detect an abnormal voltage state on the DC transmission line when the determined ratio is out of a threshold ratio range.

2. The high voltage direct current (HVDC) transmission system according to claim 1, wherein the first control unit is further configured to generate a trip signal stopping the operation of the HVDC transmission system when the abnormal voltage on the DC transmission line is detected.

3. The high voltage direct current (HVDC) transmission system according to claim 1, wherein:
    the first active power measurement unit is further configured to measure an AC and an AC voltage input to the rectifier to measure the first active power, and
    the second active power measurement unit is further configured to measure the AC and the AC voltage output from the inverter to measure the second active power.

4. The high voltage direct current (HVDC) transmission system according to claim 1, further comprising a second control unit configured to receive the second active power measured by the second active power measurement unit.

5. The high voltage direct current (HVDC) transmission system according to claim 4, wherein the first control unit is further configured to:
    receive information on the second active power from the second control unit, and
    detect the abnormal voltage state on the DC transmission line based on the first active power and the received information on the second active power.

6. The high voltage direct current (HVDC) transmission system according to claim 1, further comprising:
    a first AC filter configured to remove a harmonic current generated in the power conversion process of the rectifier, and
    a second AC filter configured to remove a harmonic current generated in the power conversion process of the inverter.

7. The high voltage direct current (HVDC) transmission system according to claim 1, wherein the rectifier and the inverter each comprise a thyristor valve or an insulated gate bipolar transistor (IGBT) valve.

8. The high voltage direct current (HVDC) transmission system according to claim 1, further comprising:
    a first capacitor connected to the rectifier in parallel and configured to smooth a DC output from the rectifier; and
    a second capacitor connected to the inverter in parallel and configured to smooth a DC input to the inverter.

* * * * *